United States Patent [19]

Meiller

[11] 4,097,088
[45] Jun. 27, 1978

[54] ARM REST ASSEMBLY FOR A SEAT, PARTICULARLY A DRIVER'S SEAT

[75] Inventor: Hermann Meiller, Amberg, Germany

[73] Assignee: Willibald Grammer, Amberg, Germany

[21] Appl. No.: 848,121

[22] Filed: Nov. 3, 1977

[30] Foreign Application Priority Data

Aug. 13, 1977 Germany ............... 7725186[U]

[51] Int. Cl.² .............................................. A47C 7/54
[52] U.S. Cl. ............................... 297/217; 297/115
[58] Field of Search ............ 297/417, 411, 162, 161, 297/421, 416, 115, 116, 117

[56] References Cited

U.S. PATENT DOCUMENTS

| 2,249,849 | 7/1941 | Owler | 297/115 |
| 3,168,346 | 2/1965 | Rei, Jr. | 297/117 |
| 3,368,842 | 2/1968 | Polsky | 297/162 |
| 3,612,606 | 10/1971 | Swenson | 297/417 |
| 3,807,799 | 4/1974 | Freedman | 297/417 |
| 3,886,611 | 6/1975 | Lammy et al. | 297/417 X |
| 3,993,350 | 11/1976 | McFarlane | 297/417 |

FOREIGN PATENT DOCUMENTS

| 945,887 | 4/1974 | Canada | 297/417 |
| 1,950,666 | 4/1971 | Germany | 297/417 |

Primary Examiner—James T. McCall
Attorney, Agent, or Firm—Staas & Halsey

[57] ABSTRACT

In a seat particularly suitable for automobiles and comprising a backrest and seating member, an armrest assembly at the side of the seat comprises an armrest hinged to a supporting lever therefor. The supporting lever is pivotably mounted for movement between a first position where it and the armrest extend alongside the seating member and a second position where it and the armrest extend alongside the backrest. The supporting lever can be propped in an intermediate position at which the armrest is supported in a position of use at a suitable elevation above the seating member.

10 Claims, 3 Drawing Figures

ARM REST ASSEMBLY FOR A SEAT, PARTICULARLY A DRIVER'S SEAT

The invention relates to an armrest assembly for a seat, particularly a driver's seat for a motor vehicle, wherein the armrest is secured to the respective side of the seat by means of an armrest supporting lever.

The known armrest assemblies of seats, particularly driver's seats, are generally so constructed that the armrest proper is fixed to the armrest supporting lever. To obtain some improvement in driving comfort, it is also known to mount the armrest on the seat so as to be adjustable for height in its operative position. This can, for example, be done by appropriately pivoting the armrest supporting lever relatively to the point at which it is secured to the seat. However, these known seats with a substantially rigid attachment of the armrest have the disadvantage that, under certain unfavourable conditions, the armrest projecting beyond the backrest makes it difficult to leave or reach the seat.

Further, seats are already known in which the armrest can be folded rearwardly up to a position substantially alongside the backrest. However, in these known seats the armrests are often not sufficiently sturdy.

Finally, it would also be convenient if in certain instances of use the armrest could be moved downwardly into a position alongside the seating surface so that one or two armrests in this position are able to increase the width of the seating surface. However, seats of this construction are as yet unknown.

It is an object of the present invention to provide an armrest assembly for seats, particularly motor vehicle seats, in which it is readily possible not only to position the armrest in its usual operative disposition relatively to the seating surface but also to bring it by means of a simple hand action into an upper limiting position adjacent the backrest as well as a lower limiting position adjacent the seating surface, such an armrest assembly being as sturdy as possible and of a construction permitting height adjustment for the armrest in a simple manner.

In an armrest assembly of the aforementioned kind, the invention proposes that the armrest be pivoted to the free upper end of the armrest supporting lever for movement between a first position, in which it and the supporting lever include an angle giving a substantially horizontal armrest surface in the position of use, and a second position, in which the armrest is approximately disposed as an extension of the supporting lever, that the supporting lever be pivoted by its lower end at the intersection between the seating member and the backrest for movement between a first limiting position adjacent the seating member and a second limiting position adjacent the backrest, and that releasable locking means be provided for supporting the armrest supporting member between the first and second limiting positions in a position of use of the armrest.

The armrest assembly according to the invention is therefore particularly distinguished by the fact that the armrest supporting lever is on the one hand articulated to the armrest itself and on the other hand has its other end pivotably secured to the actual seat. This makes it possible to bring the armrest into the three desired positions, namely the first position adjacent the seating member where it serves to increase the width of the seating member, the second position adjacent the backrest, where it increases the width of the latter, the action of reaching and leaving the seat being facilitated in both these positions because the armrest does not present an obstruction, and an intermediate position in which the armrest is located in an appropriate position of use above the seating surface. In the two limiting positions adjacent the seating member and the backrest, the armrest is disposed as an extension of the armrest supporting lever but in the intermediate operative position it extends at an angle thereto. Apart from the pivot connections between the supporting lever and the armrest and the frame of the seat, it is merely necessary to have the locking means, which can be provided at little expense because they need only support the armrest. Consequently, the armrest assembly according to the invention can be inexpensively produced. In addition, the simple construction of course also results in a correspondingly higher reliability.

It is particularly favourable if the locking means are adjustable to vary the position of use of the armrest supporting lever or of the armrest because in that case the elevation of the armrest can be adapted to the size of the particular user of the seat. The adjustability of the locking means can generally be achieved in a simple manner.

According to the invention, provision is also made for the two armrest positions relatively to the supporting lever being defined by a covering surface of a bearing recess formed in the underside of the armrest abutting against respective abutment edges of the supporting lever which engages in the bearing recess with its upper end, the said covering surface being substantially parallel to the upper surface of the armrest. With this construction one can dispense with special abutments or the like and one also reliably obtains correct alignment of the armrest relatively to its supporting lever.

The two limiting positions of the armrest supporting lever are advantageously defined by abutments which co-operate with the supporting lever and/or the armrest and are provided at the side of the seating member or backrest. These abutments can be readily applied without markedly increasing the structural size of the seat and, since they are provided on the fixed part of the seat, they can be made correspondingly sturdy.

Operation of the armrest assembly is particularly simple if the locking means are releasable by swinging the armrest upwardly with respect to the supporting lever. In this case, if the user wishes to fold the armrest upwardly, he need merely pull it up by its front edge. To fold the armrest downwardly into a position adjacent the seating member, the armrest is likewise lifted by its front edge and then the entire assembly consisting of the armrest and armrest supporting lever is moved downwardly by the forearm or the elbow until it abuts against a suitable stop or the like. Accordingly, adjustment of the armrest to the different positions can be effected without difficulty with one hand.

To achieve a particularly simple construction, the locking means preferably comprise a stationary abutment which is provided on the seat near the pivot for the lower end of the supporting lever and co-operates with a prop member connected to the supporting lever, which prop member is adjustable from a supporting position in engagement with the abutment to a releasing position beyond the region of the abutment, the prop member preferably being a lever of which the lower end can be brought into contact with the abutment and the upper end is tiltably mounted on the armrest supporting lever. It will be evident that the mounting of the supporting lever as well as its manufacture present no difficulties. Similarly, it is readily possible to provide some kind of operative connection so that the movement of the armrest is transmitted to the supporting lever in a manner such that on pivoting the armrest upwardly the supporting lever is moved out of engagement with the abutment. This can, for example, be achieved in a simple manner in that the upper end of the prop lever is provided with an actuating face which is disposed opposite the abutment in relation to the tilting axis and which is so acted on by a releasing member on the armrest that the supporting lever swings to the releasing position when the armrest is pivoted upwardly.

To simplify the adjustment in elevation of the armrest in the position of use in a construction employing the previously described prop member, it is favourable for the prop member to comprise a bearing portion pivoted to the supporting lever and a prop portion, and for the position of the prop portion to be adjustable relatively to the bearing portion to set different positions of use. Such adjustment can take place in a simple manner if the prop portion is a screw-threaded stud which is rotatable by means of a knurled disc or the like and engages in a tapped sleeve connected to the bearing portion. By changing the position of the prop portion relatively to the bearing portion, such a construction enables the elevation of the armrest to be adjusted relatively to the seating member because the bearing point for the prop member changes relatively to the bearing portion in dependence on the position ofthe prop portion, whereby the armrest supporting lever is correspondingly pivoted whilst the position of the armrest is varied.

Other features, details and advantages of the invention will be evident from the following description of a preferred example with reference to the drawings. In the drawings, which are very much simplified, :

The illustrated driver's seat as usual comprises a backrest 1 and a seating member 2 which are appropriately upholstered and curved to suit the shape of the body. The backrest 1 and seating member 2 are at both sides interconnected by a fitting or bracket 3.

Figure 2:
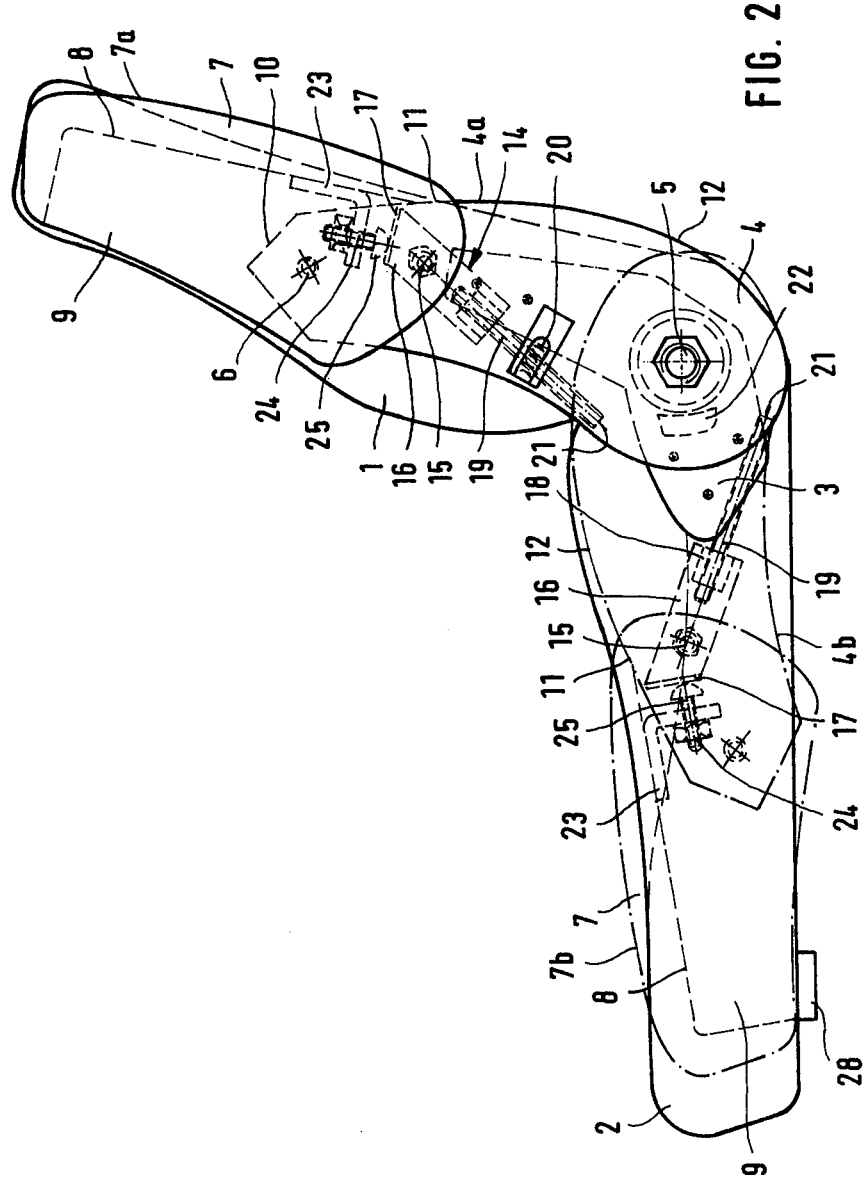
FIG. 2 is an elevation corresponding to FIG. 1, the armrest being shown in its two limiting positions adjacent the backrest and the seat.
Figure 3:
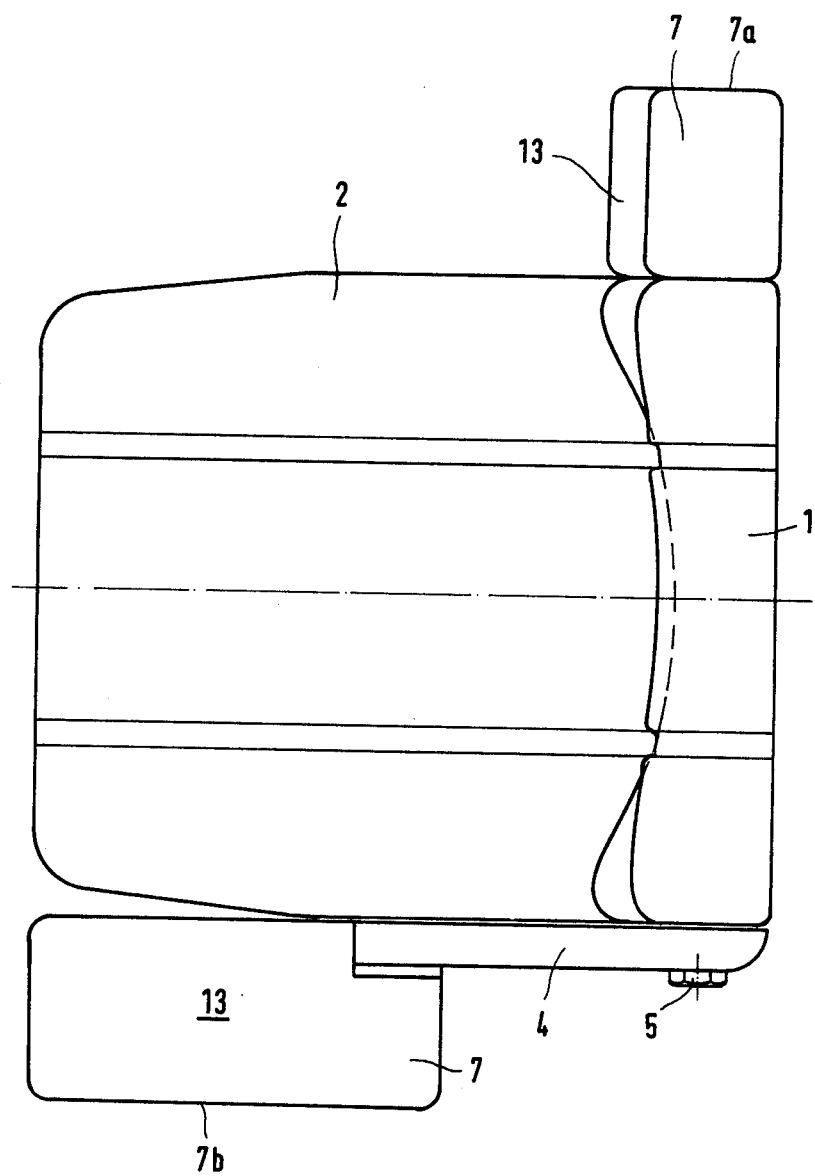
FIG. 3 is a plan view of a seat with two armrests which are illustrated in the two limiting positions.

An armrest supporting lever 4 is mounted on the fitting 3 to be pivotable about a shaft 5, namely between the two limiting positions shown in FIG. 2 in full lines at 4a and chain-dotted lines at 4b.

An armrest 7 is pivotably mounted at the free upper end of the armrest supporting lever 4 by way of a pin 6 or the like. The armrest 7 can be swung between the two positions shown in FIGS. 1 and 2, namely a position in which the surface 8 of a recess 9 formed in the underside of the armrest abuts against the end edge 10 of the armrest supporting lever and a position in which the end section 11 of the surface 8 abuts against the rear edge 12 of the armrest supporting lever 4. In this second position, in which the end section 11 abuts against the edge 12, the armrest 7 extends substantially in the same direction as the supporting lever 4 whereas in the FIG. 1 position, where the surface 8 abuts against the end edge 10, the armrest and the longitudinal axis of the supporting lever 4 include a certain angle so that the surface 13 of the armrest 7 is disposed in a substantially horizontal position.

Figure 1:
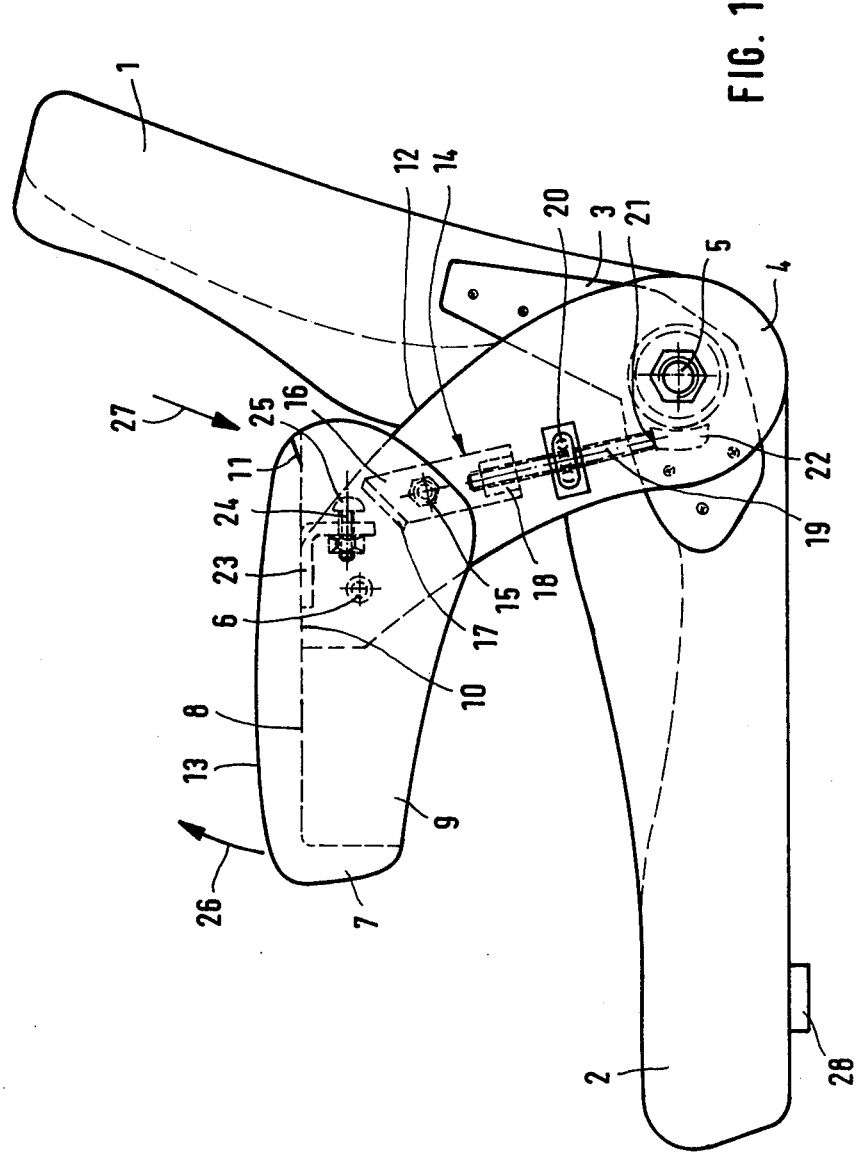
FIG. 1 is a side elevation of a seat fitted with an armrest assembly according to the invention, the assembly being disposed in its position of use.

To located the armrest 7 or its supporting lever 4 in the position of use in accordance with FIG. 1, locking means are provided which are generally indicated at 14. These locking means 14 comprise a bearing plate 16 pivotably mounted by means of a pin 15 to the supporting lever 4 near the pivot point 6 for the armrest. At its upper edge, the bearing plate 16 is provided with a ramp 17 formed by a flange or the like. At the end opposite the ramp 17, there is secured to the bearing plate 16 a tapped sleeve 18 in which a screw-threaded stud 19 serving as a prop lever is engaged with one end. The stud 19 can be turned by means of a knurled disc 20 so that the distance by which the lower end 21 of the stud 19 projects beyond the supporting plate 16 can be varied.

In the FIG. 1 position of use, the lower end 21 of the stud 19 is supported against an abutment 22 connected to the fitting 3. In this way the armrest supporting lever 4 and thus the armrest 7 are held in the position of use according to FIG. 1. The elevation of the upper surface 13 of the armrest 7 beyond the seating member 2 can be changed by actuating the knurled screw 20 by varying the distance by which the end 21 ofthe screw-threaded stud 19 projects beyond the bearing plate 16. The further the end 21 is removed from the bearing plate 16, the steeper will be the disposition of the armrest supporting lever 4 and thus the higher will be the position of the armrest 7.

One limb of an angle 23 is also secured to the surface 8 of the underside recess 9 of the armrest 7, the other limb carrying a screw 24 or the like of which the head 25 is so disposed that, when the armrest 7 is swung upwardly in the direction of the arrow 26, it acts on the ramp 17 of the bearing portion 16 and thereby pivots the bearing portion 16 in the clockwise direction whereby the lower end 21 of the stud 19 is brought out of engagement with the abutment 22.

If in a seat having an armrest assembly according to the invention the armrest 7 is to be brought upwardly into the position 7a alongside the backrest 1, the armrest 7 is merely lifted by its front edge in the direction of the arrow 26. At first, the armrest 7 is merely swung until the section 11 of the upper edge 8 lies against the rear edge 12 of the supporting lever 4. On further movement in the direction of the arrow 26, the supporting lever 4 is then also swung rearwardly in the clockwise direction until the armrest 7 and the armrest supporting lever 4 assume the position 7a shown in full lines in FIG. 2.

If, on the other hand, the armrest 7 is to be brought to the position 7b shown in chain-dotted lines in FIG. 2, the armrest 7 must likewise first of all be lifted to some extent in the direction of the arrow 26. As a result of tilting the armrest 7 about the shaft 6, the head 25 of the screw 24 then abuts the ramp 17 of the bearing portion 16. As a result, the bearing portion 16 and thus the screw-threaded stud 19 are turned about the pivot 15 in the clockwise direction. The lower end 21 of the stud 19 is thereby disengaged from the abutment 22 and the supporting lever 4 can now be moved downwardly together with the armrest 7 in the direction of the arrow 27 until the chain-dotted position 7b of FIG. 2 has been reached. In this position, the lower edge of the armrest 7 lies on an abutment 28 which projects laterally to some extent beyond the seating member 2.

If the armrest 7 is again to be brought to the FIG. 1 position of use out of its lower limiting position, it is lifted beyond this position together with the supporting lever 4 and then, without lowering the supportng lever 4, the armrest 7 is swung forwardly opposite to the direction of the arrow 26, as a result of which the bearing plate 16 and stud 19 again reach the locked position of FIG. 1. The bearing plate 16 can for example be biassed to this position by means of a spring (not shown).

When in the FIG. 1 position, the desired elevation of the surface 13 of the armrest 7 can be set by actuating the knurled screw 20.

Finally, it is pointed out that, when the armrest 7 is in its position 7a adjacent the backrest 1, it is likewise supported by abutments (not shown) provided near the backrest 1 and co-operating either with the armrest 7 itself or with its supporting lever 4.

I claim:

1. An armrest assembly for seats, comprising an armrest, a supporting lever for said armrest, means pivotably connecting said armrest to said supporting lever near one end thereof, hinge means near the other end of said supporting lever adapted to mount same for swinging motion between first and second limiting positions, releasable locking means adapted to secure said supporting lever in a position intermediate said first and second limiting positions, and means limiting pivotal motion of said armrest between an inoperative position at which said armrest is disposed substantially as a longitudinal extension of said supporting lever and an operative position at which said armrest extends transversely to said supporting lever when the latter is in its said intermediate position.

2. The assembly defined in claim 1, wherein said limiting means for pivotal motion of said armrest comprise an abutment face defined by the base of a recess formed in the underside of said armrest, said abutment face co-operating with side and end edges of said supporting lever in said inoperative and operative positions respectively.

3. The assembly defined in claim 1, wherein said locking means comprise a prop pivoted to said supporting lever, whereby said prop can be swung into and out of engagement with a fixed stop determining said intermediate position of said supporting lever.

4. The assembly defined in claim 3, wherein said prop is adjustable in length, whereby to permit adjustment of said intermediate position of said supporting lever.

5. The assembly defined in claim 4, wherein said prop comprises a nut member pivoted to said supporting lever and a stud member screw-threadedly engageable in said nut member to a variable extent.

6. The assembly defined in claim 3 including a releasing member carried by said armrest, wherein said prop is provided with ramp means so disposed in relation to said releasing member in said intermediate position of said supporting lever that it is engageable by said releasing member in said inoperative position of said armrest to swing said prop out of engagement with said fixed stop.

7. A seat comprising a seating member, a backrest connected to said seating member by a connecting member, an armrest, a supporting lever for said armrest, said armrest being pivoted to said supporting lever near one end thereof and said supporting lever being pivoted to said connecting member near the other end, abutments means defining first and second limiting positions for pivotal motion of said supporting lever, said supporting lever being disposed alongside said seating member and said backrest in said first and second limiting positions respectively, releasable locking means adapted to secure said supporting lever in an upstanding position intermediate said first and second limiting positions, and means limiting pivotal motion of said armrest between an inoperative position when said supporting lever is in either of said limiting positions and an operative position when said supporting lever is in said upstanding intermediate position.

8. The seat defined in claim 7, wherein said locking means comprise a prop pivoted to said supporting lever by one end and a fixed stop provided on said connecting member at a position where the other end of said prop rests on said stop in said upstanding intermediate position of said supporting lever.

9. The seat defined in claim 8, wherein said prop comprises a nut pivoted to said supporting lever and a stud which is screwed in said nut and supportable by said stop.

10. The seat defined in claim 9, wherein said nut is provided with a ramp and said armrest is provided with a releasing member adapted to engage said ramp to pivot said prop, whereby said stud is displaced off said stop when said armrest is pivoted to said inoperative position.

* * * * *